United States Patent
Pfeffer et al.

(10) Patent No.: US 7,645,327 B2
(45) Date of Patent: Jan. 12, 2010

(54) FRACTAL STRUCTURED NANOAGGLOMERATES AS FILTER MEDIA

(75) Inventors: Robert Pfeffer, Teaneck, NJ (US); Rajesh Dave, Short Hill, NJ (US); Stanislav Dukhin, Goldens Bridge, NY (US); Jose A. Quevedo, Brick, NJ (US); Qun Yu, South Bound Brook, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 512 days.

(21) Appl. No.: 11/416,034

(22) Filed: May 2, 2006

(65) Prior Publication Data

US 2009/0293719 A1  Dec. 3, 2009

Related U.S. Application Data

(60) Provisional application No. 60/676,758, filed on May 2, 2005.

(51) Int. Cl.
*B01D 29/02* (2006.01)

(52) U.S. Cl. .............................. 96/108; 96/134; 96/135; 96/139; 96/152; 96/153; 95/90; 95/274; 977/773; 977/775; 977/776; 977/777; 977/778; 55/434; 55/512; 55/522; 55/524

(58) Field of Classification Search .................. 96/108, 96/134, 135, 139, 152, 153; 977/773, 775–778; 55/524, 434, 512, 522; 95/90, 274
See application file for complete search history.

(56) References Cited

U.S. PATENT DOCUMENTS

| | | | |
|---|---|---|---|
| 3,439,899 A | 4/1969 | Hershler | |
| 3,848,363 A | 11/1974 | Lovness, et al. | |
| 4,720,025 A | 1/1988 | Tatevosian et al. | |
| 5,927,621 A | 7/1999 | Ziolo et al. | |
| 6,039,894 A | 3/2000 | Sanjurjo et al. | |
| 6,162,530 A * | 12/2000 | Xiao et al. | 428/292.1 |
| 6,471,096 B1 | 10/2002 | Dave | |
| 7,256,320 B2 * | 8/2007 | Purdum et al. | 588/249.5 |
| 2003/0033934 A1 | 2/2003 | Espin et al. | |

(Continued)

OTHER PUBLICATIONS

PCT International Search Report dated Sep. 28, 2006.
M.V. Filippov, The effect of a magnetic field on a ferromagnetic particle suspension bed, Prik. Magnit. Lat. SSR, 12 (1960) 215 (no translation).
Wang et al., Fluidization and agglomerate structure of SiO$_2$ nanoparticles, Powder Technology, 124 (2002) 152-159.8.

(Continued)

*Primary Examiner*—Duane Smith
*Assistant Examiner*—Christopher P Jones
(74) *Attorney, Agent, or Firm*—McCarter & English, LLP

(57) ABSTRACT

Systems and methods for achieving filtration are provided that utilize agglomerates or granules of nanoparticles. The agglomerates or granules of nanoparticles may be used as and/or incorporated into a HEPA filtration system to remove solid or liquid submicron-sized particles, e.g., MPPS, in an efficient and efficacious manner. The filtration systems and methods are provided that utilize agglomerates or granules in a size range of about 100-500 microns. The agglomerates or granules of nanoparticles exhibit a hierarchical fractal structure. In the case of agglomerates of nanoparticles, porosities of 0.9 or greater are generally employed, and for granules of nanoparticles, porosities that are smaller than 0.9 may be employed. Filter media formed from the agglomerates or granules may be formed from materials such as carbon black and fumed silica, and may be employed in baffled or non-baffled filtration apparatus.

25 Claims, 12 Drawing Sheets

U.S. PATENT DOCUMENTS

| | | | |
|---|---|---|---|
| 2004/0092653 A1* | 5/2004 | Ruberti et al. | 524/563 |
| 2004/0118287 A1* | 6/2004 | Jaffe et al. | 96/121 |
| 2004/0129140 A1 | 7/2004 | Park et al. | |
| 2004/0137209 A1 | 7/2004 | Zeller et al. | |
| 2005/0000901 A1* | 1/2005 | Campbell et al. | 210/660 |
| 2005/0045031 A1 | 3/2005 | Rajagopalan et al. | |
| 2006/0086834 A1 | 4/2006 | Pfeffer et al. | |

OTHER PUBLICATIONS

Matsuda et al., Particle and bubble behavior in ultrafine particle fluidization with high G, Fluidization X, Eng. Found, 2001, 501-508.

Matsuda et al., Modeling for size reduction of agglomerates in nanoparticle fluidization, AIChE 2002 Annual Meeting, Nov. 3-8, 2002, Indianapolis, IN, 138e.

M.V. Filippov, the effect of a magnetic field on a ferromagnetic particle suspension bed, Prik. Magnit. Lat. SSR, 12 (1960) 215.

R. E. Rosensweig, Process concepts using field stabilized two-phase flow, J. Of Electrostatics, 34 (1995)163-187.

V.L. Ganzha, S.C. Saxena, Heat-transfer characteristics of magnetofluidized beds of pure and admixtures of magnetic and non-magnetic particles, Int. Journal of Heat Mass Transfer, 41(1998) 209-218.

J. Arnaldos, J. Casal, A. Lucas, L. Puigjamer, Magnetically stabilized fluidization: modeling and application to mixtures, Powder Technology, 44(1985) 57-6224.

W.Y. Wu, A. Navada, S.C. Saxena, Hydrodynamic characteristics of a magnetically stabilized air fluidized bed of an admixture of magnetic and non-magnetic particles, Powder Technology, 90(1997) 39-46.

W.Y. Wu, K.L. Smith, S.C. Saxena, Rheology of a magnetically stabilized bed consisting of mixtures of magnetic and non-magnetic particles, Powder Technology, 91(1997) 181-187.

X. Lu, H. Li, Fluidization of $CaCO_3$ and $Fe_2O_3$ particle mixtures in a transverse rotating magnetic field, Powder Technology, 107(2000) 66-78.

Morse, *Sonic energy in granular solid fluidization*, Ind. Eng. Chem., 47 (6) (1955) 1170-1175.

Russo et al., The influence of the frequency of acoustic waves on sound-assisted fluidization of beds of fine particles, Powder Technology, 82 (1995) 219-230.

Levy et al., Effect of an acoustic field on bubbling in a gas fluidized bed, Powder Technology, 90 (1997) 53-57.

Chirone et al., Bubbling fluidization of a cohesive powder in an acoustic field, Fluidization VII, 1992, 545-553.

* cited by examiner

FRACTAL STRUCTURED NANOAGGLOMERATES AS FILTER MEDIA

CROSS-REFERENCE TO RELATED APPLICATION

The present application claims the benefit of a provisional patent application entitled "Fractal Structured Nanoagglomerates as Filter Media," filed on May 2, 2005 and assigned Ser. No. 60/676,758. The entire contents of the foregoing provisional patent application are incorporated herein by reference.

The U.S. Government has a paid-up license in this invention and the right in limited circumstances to require the patent owner to license others on reasonable terms as provided for by the terms of Grant No. NSF-BES-0507936 awarded by the National Science Foundation.

BACKGROUND

1. Technical Field

The present disclosure is directed to systems and methods that utilize agglomerates of nanoparticles to effect advantageous filtration. In exemplary embodiments of the present disclosure, agglomerates of nanoparticles are used as a HEPA filtration system to remove solid or liquid submicron-sized particles, e.g., MPPS, in an efficient and efficacious manner.

2. Background Art

Air filters with particularly high collection efficiency for submicron size particles (under 1 μm) are generally referred to as High Efficiency Particulate Air (HEPA) filters. Submicron size particles are generally the most difficult to filter and are commonly known as the "most penetrating particle size" (i.e., MPPS). HEPA filters are used extensively in the microelectronics field (e.g., in clean rooms) and in the pharmaceutical industry. HEPA filters are also used in hospitals, in food and cosmetic production facilities, and even in residential settings, e.g., in air purifiers and vacuum cleaners. In each of these applications, the filtration objective is either to prevent contamination of a particularly sensitive product with particulate pollutants or to protect human beings from dangerous particulates, such as microorganisms (e.g., bacteria, viruses and/or mold), pollen, asbestos, etc.

HEPA filters are generally fiber-based and are made up of an entanglement of thin (usually less than one micron in diameter) fibers. A scanning electron microscope (SEM) image of a conventional fiber-based filter is presented in FIG. 1. With fiber-based materials, particles are collected by several classical mechanisms, such as diffusion, interception and inertial impaction. Two important performance-related parameters associated with these filters are pressure drop and collection efficiency. Collection efficiency (E) is related to penetration (P) by the formula: $P=1-E$. These performance-related parameters generally depend on the filter structure (e.g., packing density, fiber diameter), operating conditions (e.g., filter velocity, temperature) and the properties of the systems (e.g., aerosols) to be filtered (e.g., density, mean particle size, particle size distribution, solid or liquid). In addition, the performance-related parameters depend strongly on filter loading.

SEM studies of the filter loading of HEPA fiber filters with solid particles show that the filtration initially takes place in the depth of the filter with the formation of chain-like agglomerates called dendrites. During this initial stage in the filtration process and at constant face velocity, the pressure drop across the filter generally rises linearly with the amount of mass/particles collected. However, as the dendrites begin to fill the spaces between the fibers of the filter, a filter cake of increasing thickness begins to form at the upstream surface of the filter and the slope of the pressure drop with increasing loading rises sharply, indicating that the filter is being clogged.

For liquid particles (mists), in the early stage of filtration using a fiber-based HEPA filter, particles are deposited as droplets around the fibers and the pressure drop rises slowly with mass collected per unit of filter area. However, at a certain point during filtration, a sharp exponential rise in pressure drop is observed. This behavior may be attributed to the presence of a liquid film covering the filter surface. It is believed that droplets deposited on the filters progressively grow and join together to form bridges at the intersection of several fibers. At the point of clogging, all (or substantially all) of the interstices of the first layer of fibers are filled in, forming a film covering the filter surface. It is noted that clogging occurs at a much higher loading level for liquid particles, e.g., mists, than for solid particles.

When clean, HEPA fiber-based filters provide excellent filtration efficiency and low pressure drop for both solid and liquid MPPS and filtration occurs throughout the depth (deep bed filtration) of the filter. However, as soon as the upstream surface becomes heavily clogged with particulates, filtration only occurs at the filter's surface (cake filtration) leading to a sharp rise in pressure drop. Based on this sharp rise in pressure drop, filtration performance becomes unacceptable and the filter needs to be cleaned or replaced. In typical fiber-based HEPA filters, this degradation in performance occurs at a loading (mass of particulates collected) of about 1-7 $g/m^2$ of filter area.

Accordingly, a need exists for improved filtration systems and methods. More particularly, a need exists for filtration systems and methods that offer efficient and reliable filtration for sub-micron size particles, e.g., MPPS. The foregoing needs extend across a host of fields, industries and applications, including, for example, the microelectronics field, the medical device/pharmaceutical industries, health care applications, including hospitals, food and cosmetic production facilities, and residential settings, e.g., in air purifiers and vacuum cleaners. Thus, a need exists for filtration systems and methods that effectively filter MPPS from feed streams that contain liquid and/or solid particles so as to prevent/reduce the potential for contamination and/or to protect systems/individuals from undesirable particulates, e.g., microorganisms such as bacteria, viruses and/or mold, pollen, asbestos, and the like.

These and other needs are satisfied by the systems and methods of the present disclosure, as will be apparent from the description which follows, particularly when read in conjunction with the figures appended hereto.

SUMMARY OF THE DISCLOSURE

According to the present disclosure, systems and methods for achieving effective filtration of sub-micron particles are provided. The disclosed systems and methods utilize agglomerates of nanoparticles to achieve desired filtration results. In exemplary embodiments of the present disclosure, agglomerates of nanoparticles are used as and/or incorporated into a HEPA filtration system to remove solid or liquid submicron-sized particles, e.g., MPPS, in an efficient and efficacious manner. In alternative exemplary embodiments of the present disclosure, engineered particle systems characterized by hierarchical self-similar elements are generated/formed for use in filtrations systems and other commercial, industrial and/or consumer applications.

More particularly, the present disclosure provides systems and methods that employ agglomerates or granules of nanoparticles and/or engineered particle systems that include hierarchical self-similar elements as the filter media in a HEPA filter to remove submicron size (under 1 µm) particles (solid and liquid) which are the most difficult to filter, and are commonly known as the most penetrating particle size (MPPS). According to exemplary embodiments of the present disclosure, a bed of nanoparticles and/or engineered particles is provided in a dry state, the bed consisting of porous agglomerates with a hierarchical fractal structure having porosities of 0.9 or greater, or granulated nanoparticles which can have porosities that are smaller than 0.9.

The bed of agglomerates/granules of nanoparticles acts like a granular bed filter having the advantage of using extremely porous particles having a rough and extended surface area available for trapping submicron particles. The depth of the granular bed depends on the size of the agglomerates/granules and also on the collection efficiency desired. For example, when the agglomerate/granule size ranges between 150 to 250 microns, the depth of the filter is generally in the range of 2 to 3 inches in order to achieve optimal collection efficiency and keep the resistance or pressure drop across the filter small when running at gas velocities less than 5 cm/s. However, if larger velocities are required, the size of the agglomerates can be increased, as well as the depth of the filter, in order to maintain optimal pressure drop and collection efficiency.

The large gaps between agglomerates of nanoparticles and/or engineered particle beds of the present disclosure result in low hydrodynamic resistance, which translates to a smaller pressure drop across the bed. In addition, the presence of multimodal pores, i.e., pores of many different sizes, as well as capture surfaces that are of different size/scale within the same filter bed advantageously results in low penetration for MPPS as well as a high filter capacity.

Regarding the filtration capacity, it is important to note that a granular bed filter composed of agglomerates/granules of nanoparticles has a larger capacity than HEPA fiber-based filters. The pressure drop of a nanoagglomerate filter increases at a slower rate than a HEPA filter, which is an indication of higher capacity, since the filter can operate for a longer time. The pressure drop is an indication of the resistance of the filter to the flow of gas, the higher the resistance the lesser amount of gas that the filter can clean.

Additional advantageous features, functions and benefits of the disclosed nanoagglomerate-based filtration media and associated filtration systems will be apparent from the description which follows, particularly when read in conjunction with the accompanying figures.

BRIEF DESCRIPTION OF THE FIGURES

To assist those of ordinary skill in the art in making and using the filtration media of the present disclosure, reference is made to the accompanying figures, wherein.

DESCRIPTION OF EXEMPLARY EMBODIMENT(S)

Systems and methods for effective filtration of sub-micron particles utilizing agglomerates of nanoparticles to achieve desired filtration results are disclosed herein. The disclosed agglomerates of nanoparticles may be advantageously used as and/or incorporated into a HEPA filtration system to remove solid or liquid submicron-sized particles, e.g., MPPS. According to exemplary embodiments of the present disclosure, hierarchical self-similar elements are employed, in whole or in part, as the filter media in a HEPA filter to remove submicron size (under 1 μm) particles (solid and liquid). Indeed, exemplary filtration media according to the present disclosure include nanoparticles and/or engineered particles in a dry bed that includes porous agglomerates with a hierarchical fractal structure and a porosity of 0.9 or more and, in the case of granulated nanoparticles, porosities that may be smaller than 0.9.

Nanoagglomerate systems for use in the disclosed filtration media may be formed through appropriate agglomeration and/or particle handling techniques, including specifically the fluidization techniques disclosed in a co-pending, commonly assigned U.S. patent application entitled "System and Method for Nanoparticle and Nanoagglomerate Fluidization" (Ser. No. 10/900,867, filed Jul. 27, 2004). As described in the foregoing patent disclosure, certain nanoparticles can be fluidized in the form of relatively large (~100-500 μm), stable agglomerates that are extremely porous ($\epsilon$~0.99). More particularly, nanoparticle and/or nanoagglomerate systems may be exposed to a combined flow of fluidizing gas and at least one additional force, e.g., a vibration force, a magnetic force, an acoustic force, a rotational/centrifugal force and/or a combination thereof, to achieve the desired. A fluidizing gas (e.g., air, $N_2$, He, Ar, $O_2$ and/or combinations thereof or other fluidizing gas or gases) may be combined with an appropriate amount of magnetic energy, mechanical energy, acoustic energy and/or rotational/centrifugal energy to enhance fluidization by disrupting interparticle forces. The nanoparticles/nanoagglomerates treated according to the disclosed system/method can form highly porous agglomerates in the size range of approximately 200-400 microns. Additional techniques and associated parameters for processing of nanoparticles/nanoagglomerates to form hierarchical fractal structures consisting of sub-agglomerates or aggregates at a number of different length scales, down to individual nanosize particles, are disclosed in the foregoing U.S. patent application, the entire contents of which are hereby incorporated by reference.

Figure 1:
FIG. 1 is an SEM image of a prior art fiber-based filter.
Figure 2:
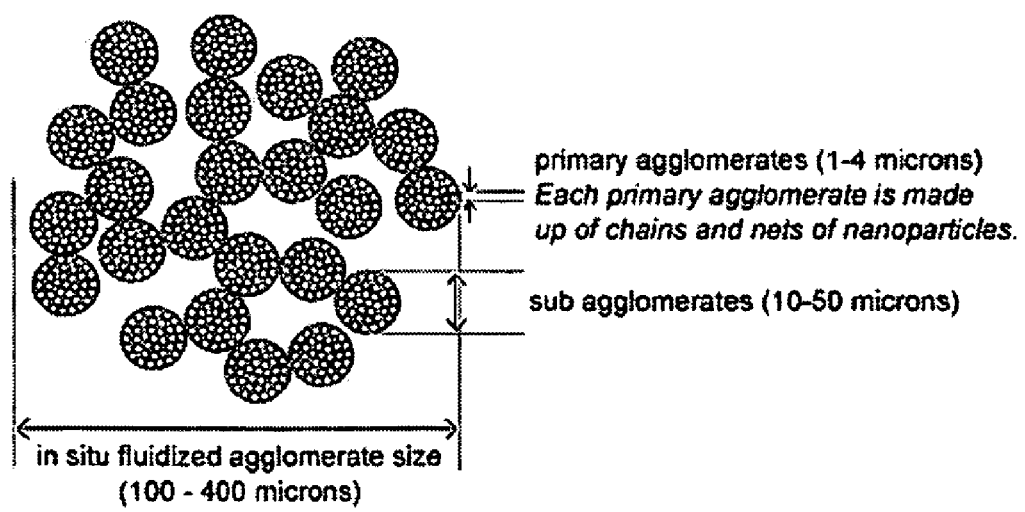
FIG. 2 is a schematic illustration showing an exemplary hierarchical structure of fluidized agglomerates which are composed of sub-agglomerates (SA), which are in turn composed of primary agglomerates (PA)
Figure 3A:
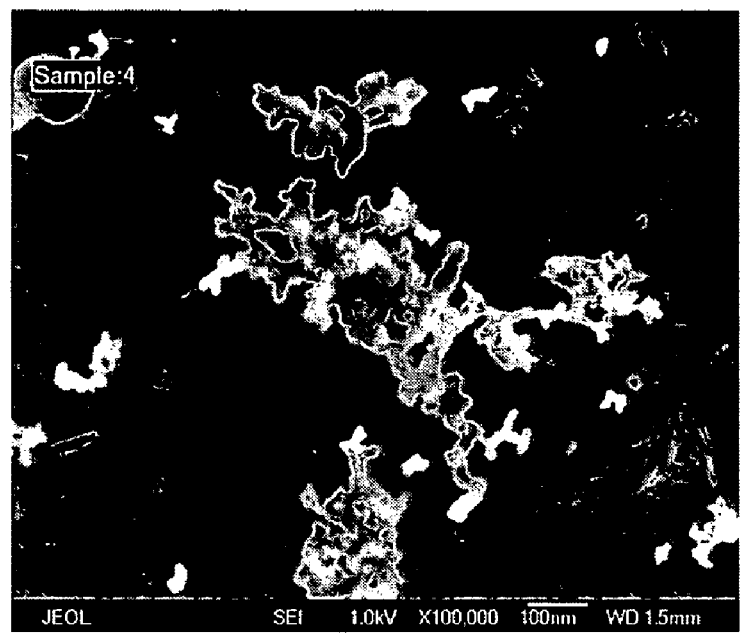
FIG. 3A is an SEM image showing individual silica nanosize particles sintered together in a chain-like structure (scale bar=100 nm; magnification=100,000)
Figure 3B:
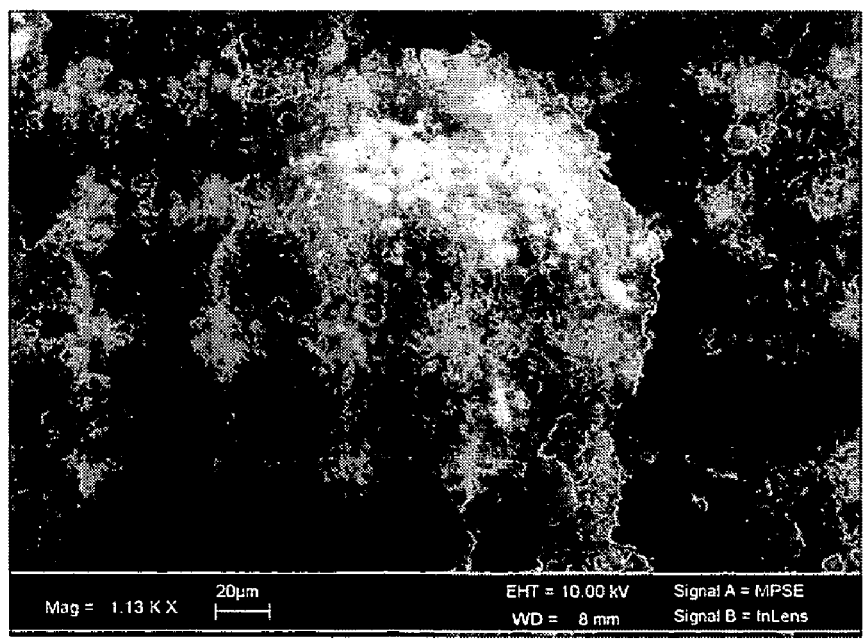
FIG. 3B is an SEM image showing an agglomerate of nanosize fumed silica of about 140 µm (scale bar=20 µm; magnification=1.13 K)

Structural aspects of exemplary silica nanoagglomerates associated with the disclosed filter systems are shown in the schematic diagram of FIG. 2 and the SEM images of FIGS. 3A and 3B. As noted in the schematic diagram of FIG. 2, exemplary filtration media of the present disclosure are generally defined by a hierarchical structure of fluidized agglomerates, wherein the hierarchical structure includes sub-agglomerates (SA), which are in turn formed from primary agglomerates (PA). The primary agglomerates are typically composed of chains and/or net-like structures of individual nanoparticles. The primary agglomerates are generally sized between 1-4 microns, whereas the sub-agglomerates formed from the primary agglomerates are generally sized between 10-50 microns. These dimensional ranges are illustrative of exemplary embodiments of the disclosed hierarchical structures, but alternative implementations with dimensional features falling outside the noted ranges, in whole or in part, may be employed without departing from the spirit or scope of the present disclosure. Of note, in exemplary applications of the present disclosure, the nanoagglomerates (in whole or in part) may be subject to compressive and/or compaction forces in connection with formation of a filtration media and, in such circumstances, the compressive or compaction forces may impact upon the size distribution and/or porosity of the nanoagglomerate system.

Fluffy agglomerates of fumed silica nanoparticles can be obtained by removing them from a fluidized bed. Large agglomerates may also obtained by consolidation during vibrated sieving of the nanoparticles. The large agglomerates that do not pass through the mesh are generally selected for use in the filter bed. Sizes are selected according to the sieve mesh size and can vary, e.g., from 250 μm up to 800 μm. Granules of nanoparticles, e.g., carbon black granules, may be made by standard granulation processes, as are known in the art, and such granules may be separated by sieving according to the filter module design. Granule sizes according to the present disclosure generally range from 150 up to 800 microns.

In-situ photographs were taken at the surface of a fluidized bed of exemplary silica nanoagglomerates prepared according to the techniques disclosed in the previously identified non-provisional patent application. The nanoagglomerates were formed from Degussa R974 silica (primary particle size~12 nm). Based on image analysis of over 800 images, a mean agglomerate size of about 200 μm was calculated for such nanoagglomerates. Yet, when the agglomerates were removed from the fluidized bed and studied under SEM, the mean particle size appeared to be about 30 μm, an order of magnitude smaller than that observed from the in-situ photographs. Based on this mean agglomerate size differential, it is believed that large nanoagglomerates formed from silica are extremely fragile and that removing them from a fluidized bed and preparing them for SEM analysis fragmented them into what may be termed "sub-agglomerate" (SA) form.

Figure 4A:
FIG. 4A is an SEM image showing clean agglomerates (granules) of carbon black of about 160 µm (scale bar=30 µm; magnification=555)
Figure 4B:
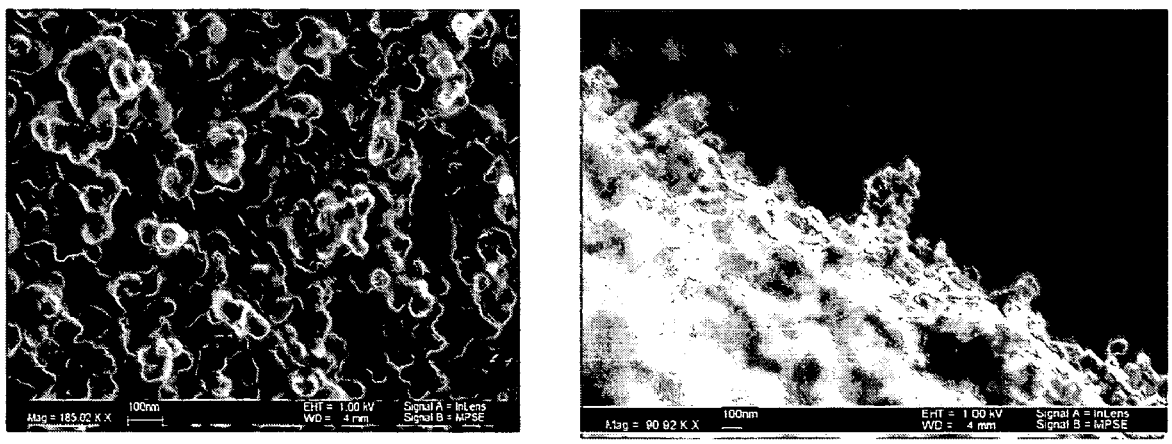
FIG. 4B includes a pair of SEM images showing details of the surface of an agglomerate (granule) of carbon black of about 160 µm (scale bar=100 nm); the left image is at a magnification of about 185K and the right image is at a magnification of about 90K.

With reference to the SEM images included herewith as FIGS. 3A, 3B, 4A and 4B, it is noted that agglomerates of nanoparticles are generally characterized by a relatively irregular shape. In addition, the nanoparticle agglomerates generally include a rough and porous surface. The surface properties of such nanoparticle agglomerates are believed to be generally effective in promoting the interception of submicron particles. Thus, FIG. 3A sets forth an SEM image showing individual silica nanosize particles sintered together in a chain-like structure, and FIG. 3B sets forth an SEM image showing an agglomerate of nanosize fumed silica of about 140 μm. FIG. 4A sets forth an SEM image of clean agglomerates (granules) of carbon black of about 160 μm, and FIG. 4B sets forth a pair of SEM images (at different magnifications) showing details of the surface of an agglomerate (granule) of carbon black of about 160 μm.

As described herein, nanoagglomerates having a hierarchical fractal structure, including particularly nanoagglomerates that consist, in whole or in part, of granulated nanoparticles, may be advantageously used as a filter media according to the present disclosure. Although the present disclosure describes exemplary implementations wherein fumed silica and carbon black agglomerates and granules are employed, the present disclosure is not limited to such constituents. However, the availability and relatively low cost of such materials make them particularly suitable choices. Alternative nanoparticle materials may be employed in preparing the disclosed nanoagglomerates and/or granules, e.g., titanium, as will be apparent to persons skilled in the art from the present disclosure.

The filter media may be used to remove, inter alia, submicron particles, e.g., MPPS particles (solid and liquid), in a host of commercial and industrial applications, e.g., from industrial gas streams. The nanoagglomerates are relatively large in size, which translates to relatively low gas pressure drop across the filter media. In addition, the disclosed nanoagglomerates and nanoagglomerate systems are extremely porous, e.g., with an overall internal porosity greater than 0.9. Indeed, in exemplary implementations of the present disclosure using Degussa R974 silica nanoagglomerates, porosity levels on the order of 0.99 have been measured. According to the present disclosure, high porosity nanoagglomerate filtration systems provide or deliver advantageous filtering characteristics/performance and, in particular, provide filter media that will allow some of the "dusty" gas to be effectively filtered thereby.

In addition, the physical properties and characteristics of the disclosed nanoagglomerates and nanoagglomerate systems provide an advantageous filter media for filtering liquid particles (mists) that wet the surface of the nanoagglomerates. In such systems, the nanoagglomerates act as a "sponge" and suck in the liquid drops by capillary action. Thus, the physical properties and characteristics of the disclosed nanoagglomerates and nanoagglomerate systems provide an effective and efficient filter media for liquid particle systems.

Figure 5A:
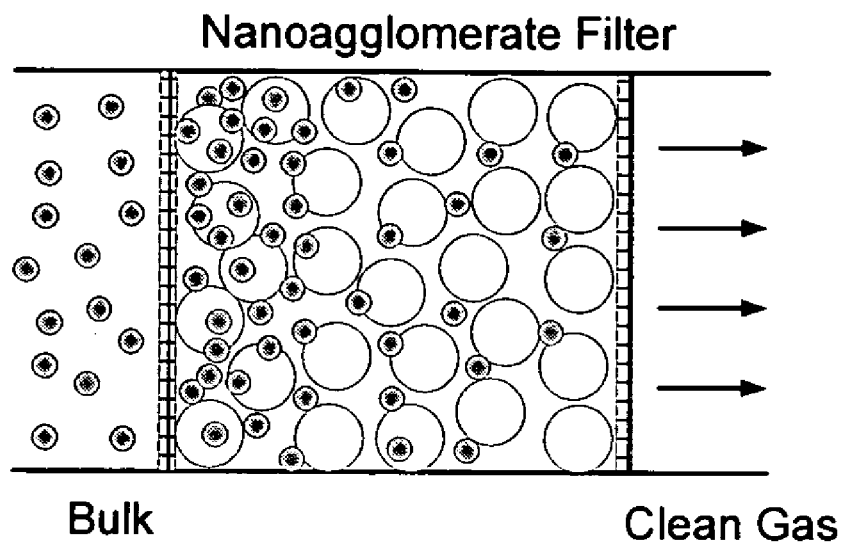
FIG. 5A is a schematic depiction of gas flow through an exemplary nanoagglomerate filtration media according to the present disclosure.

Moreover, the relatively large distance between adjacent nanoagglomerates (high external porosity as well as high internal porosity) translates to further advantageous filtration properties. For example, the high external porosity of the disclosed nanoagglomerates and nanoagglomerate systems provides advantageous deep bed filter performance without surface cake formation. Thus, as schematically depicted in FIG. 5A, in a filtration mode, the nanoagglomerates function as a packed bed such that particulates and/or other contaminants, e.g., solid aerosol particles, deposit over different layers of granules/agglomerates, thereby filling up a volume rather than a surface. As a result, larger amounts of particulates/contaminants/aerosol particles can be captured according to the present disclosure, without significantly increasing the resistance of and/or pressure drop associated with the filter system.

Figure 5B:
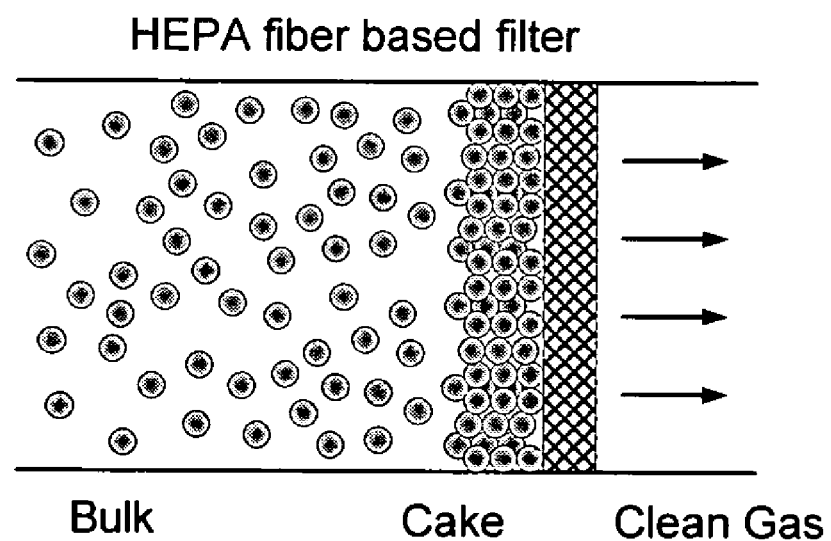
FIG. 5B is a schematic diagram of gas flow through a conventional (prior art) HEPA fiber-based filter.

In distinct contrast and as schematically depicted in FIG. 5B, in conventional fiber-based HEPA filter systems, surface cake formation invariably occurs, causing fiber-based HEPA filters to clog rather quickly. As solid aerosol particles deposit over the layer of fibers, the gaps are filled and the collection efficiency improves; however, the resistance of the filter increases, limiting the operative life of the filter. Thus, as compared to prior art fiber-based filter systems, higher submicron particle removal capacities are expected for the disclosed nanoagglomerates and nanoparticle granules filtration media.

In addition, it has been found that there is a relationship between the agglomerate/granule size, depth of the filter, resistance and collection efficiency. For example, it has been found that a 3 inch thick packed bed of granules in the range of 150 to 250 microns has a very good collection efficiency that is equivalent to conventional HEPA filter systems, but the pressure drop is larger. However, by decreasing the depth of the filter to 2 inches or increasing the agglomerate size to a range of between 250 to 500 microns, the resistance of the filter is reduced at the expense of lower collection efficiency. Based on experimental studies, it has been found that the optimal agglomerate size in the case of nanoparticle granulated materials—taking into consideration collection efficiency and pressure drop/resistance—is in the range of about 150 to 250 microns. Indeed, based on the totality of favorable properties, characteristics and structures described herein, nanoagglomerates and nanoagglomerate systems may be used as filter media in HEPA filter systems to provide performance that at least equals the performance of fiber-based HEPA filters (high collection efficiency), but with a much higher (approximately 100 times higher) dust loading capacity.

Experimental results indicate that a nanoagglomerate-based HEPA filter produces sufficiently low penetration for MPPS at an acceptable pressure drop level, but with a much higher capacity (approximately two orders of magnitude higher) than a fiber-based HEPA filter. Another advantage of using this type of filter media is that relatively inexpensive, mass-produced nanoparticles in the form of agglomerates or granules, such as silica and/or carbon black, may be employed. These materials/nanoparticles offer a cost advantage over existing fiber-based HEPA filters.

To further illustrate the advantageous properties and applications of the disclosed hierarchical nanoagglomerate structure as filtration media, a series of examples are described herein. However, the examples set forth herein are not limiting with respect to the present disclosure, but are merely illustrative thereof.

EXAMPLE 1

Submicron SiC powder particles (average size 0.6 µm) were dispersed in air using a RODOS dry particle disperser (Sympatec, Inc). Hydrophobic fumed silica particles, specifically Aerosil R972 (Degussa), with a primary particle size of 16 nm and a specific surface area (BET) of 110 $m^2/g$ were used as the filter media. Silica nanoagglomerates were sieved and consolidated by vibration to obtain sizes between 250 and 410 microns; these sizes were chosen so as to obtain a low penetration and also to keep the pressure drop across the filter media low.

The filter assembly consisted of a square acrylic plastic frame with a 3 cm thick cylindrical cavity, 4.45 cm in diameter. This frame was filled with the nanoagglomerate filter media. Two (2) fine mesh screens with apertures of 120 μm were positioned to capture/contain the filter media at the front and back of the frame. An aerosol stream was fed through the filter media contained within the frame. The number of particles in the aerosol stream, before and after the filter, was measured using an Aerosizer instrument (Amherst/TSI Instruments).

During preliminary experiments, it was found that the high concentration of aerosol produced by the RODOS distorted the results due to coagulation of the aerosol particles before they entered the filter. Therefore, the aerosol stream was diluted and only a small portion of the air stream generated by the RODOS was used in the filtration experiment, i.e., fed through the filter media, while the rest was vented to a fume hood. Even when the powder was dispersed with as much as 12 scfm of air, the concentration of aerosol was still relatively high, about 0.33 $g/m^3$.

The air stream going to the filter media assembly was measured by a calibrated orifice plate, which gave a pressure drop that correlated with the gas flow rate. The pressure drops across the filter media and across the orifice plate were measured with water monometers, and iso-kinetic sampling ports were installed before and after the filter media. The sampling flow rate in the Aerosizer instrument was adjusted to 0.15 l/m and the sampling time was 3 minutes. Due to increases in the pressure drop across the filter media during aerosol filtration, the flow rate passing through the filter media would normally decrease. Conditions were adjusted to maintain the flow rate at a constant level. In particular, the venting valve was partially closed, which raised the pressure upstream of the filter, thereby keeping/maintaining the airflow through the filter at a constant level.

Figure 6A:
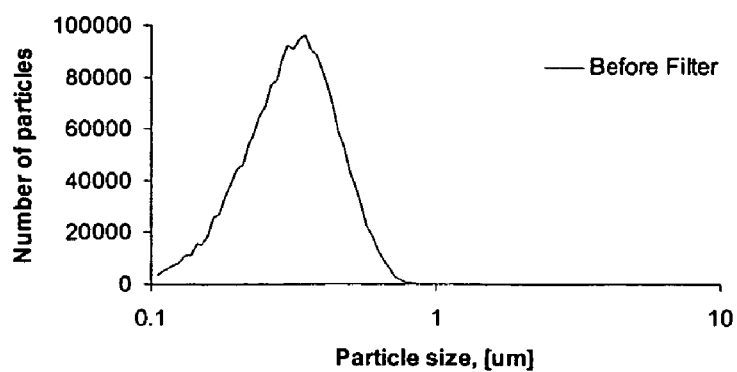
FIG. 6A is plot of particle size distribution of an aerosol stream before an exemplary nanoagglomerate filter in an experimental run (Example 1) described herein.
Figure 6B:
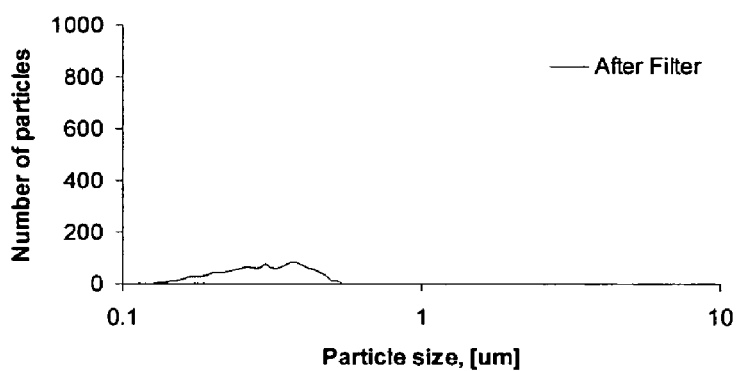
FIG. 6B is a plot of particles size distribution of an aerosol stream after an exemplary nanoagglomerate filter in an experimental run (Example 1) described herein.
Figure 7:
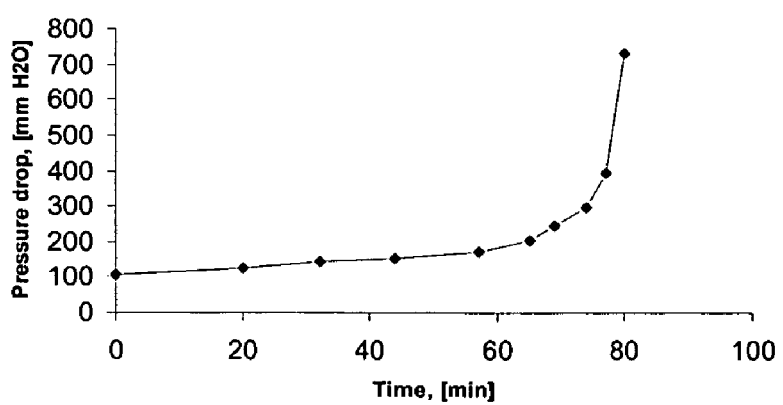
FIG. 7 is a plot of pressure drop across an exemplary nanoagglomerate filter (30 mm thick) relative to time while filtering a constant concentration source of SiC aerosol at a gas velocity of 5.7 cm/s, as described in Example 1 herein.
Figure 8A:
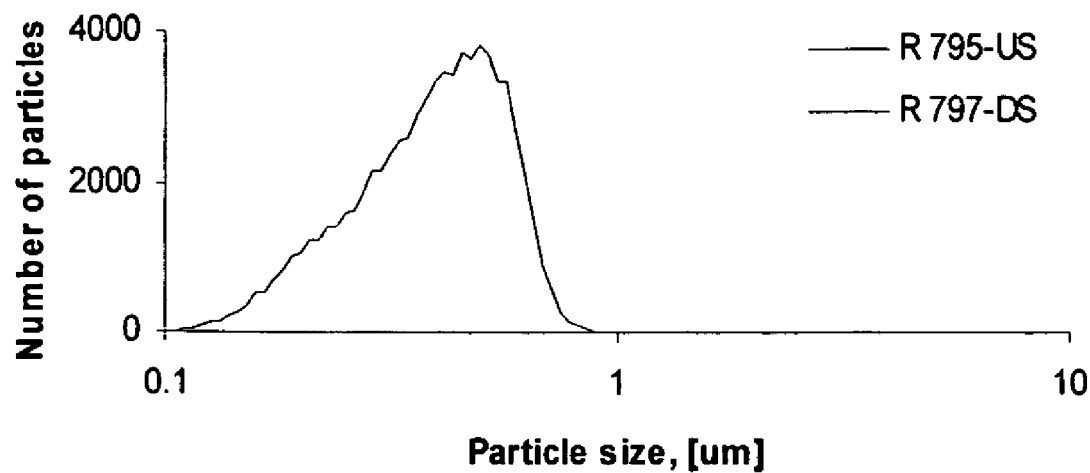
FIG. 8A is a plot of particle size distribution of a SiC solid aerosol before an exemplary nanoagglomerate filter, as described in Example 2 herein.
Figure 8B:
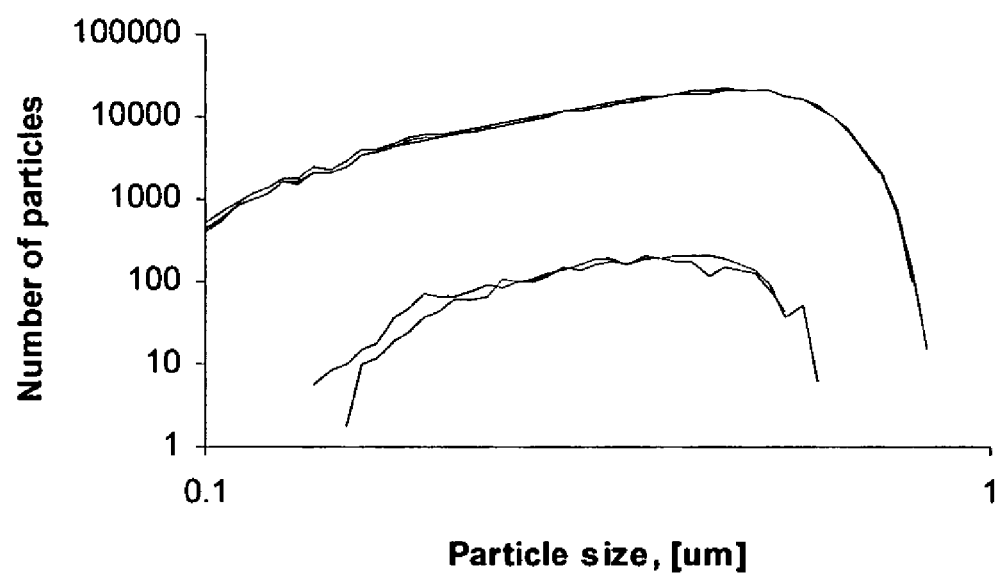
FIG. 8B is a plot of particle size distribution of a SiC solid aerosol before (upper curve) and after (lower curve) an exemplary nanoagglomerate filter, as described in Example 2 herein.

Based on these experimental studies, FIG. 6A shows a representative number particle distribution of SiC before the filter and FIG. 6B shows a representative particle size distribution after passing through the filter. By comparing the data contained in these two figures, it is readily apparent that the reduction in the count of aerosol particles is very significant for these MPPS particles using the nanoagglomerate filtration system/method of the present disclosure. From the data of FIGS. 6A and 6B, penetration values can be calculated. The total penetration for particles in the range from 0.1 to 1 μm was 0.0005 (99.95% collection efficiency), with a maximum penetration of about 0.001 (99.9% collection efficiency) at a particle size of 0.16 μm.

The foregoing penetration results compare very favorably with fiber-based HEPA filters. In addition, these experiments were run at an air velocity of 5.7 cm/s (based on the pressure drop measured across the orifice plate). This velocity value is within the range of operation of typical fiber-based HEPA filters.

The pressure drop across the experimental filter was also measured/recorded during these experimental runs and the change in pressure drop with time is shown in FIG. 7. In this figure, the pressure drop is relatively constant (and comparable to fiber-based HEPA filters) for about 1 hour of filtration. After about 1 hour, saturation of the filter media occurred, as manifested by a large increase in the pressure drop. For more realistic operating conditions at a lower aerosol concentration, much longer filter run duration before encountering saturation than was observed in these initial experiments can be expected. The results shown in FIG. 7 were obtained across a nanoagglomerate filter having a thickness of 30 mm thick that was used to filter a constant concentration source of SiC aerosol at a gas velocity of 5.7 cm/s at a concentration of about 0.3 $g/m^3$; for a reduced aerosol concentration of 1 $mg/m^3$, the effective run time for this exemplary nanoagglomerate filter should advantageously increase to about 300 hours.

The capacity of the filter media is given by the ratio of the weight of aerosol collected to the cross-sectional area of the filter before clogging occurs. This ratio for solid aerosol particles in fiber-based HEPA filters is approximately 7 $g/m^2$. In the experiments described herein, the mass of aerosol retained by the filter was of about 0.1044 grams over a cross sectional area of 15.5 $cm^2$, giving a capacity of about 67 $g/m^2$. This performance level is on the order of 10 times greater than that achieved in fiber-based HEPA filters.

EXAMPLE 2

Carbon Black Regal 660 A69 granules of sizes between 150 to 250 microns, provided by Cabot Corp., were customized as a packed bed. An acrylic plastic module of 2 inches in depth and with a cylindrical cavity of 1.75 inches in diameter was used as frame. Three layers of fabric of 69 microns held the granulated material at the top and at the bottom of the frame. The selection of the size of the granules was based on previous experiments conducted to determine optimum agglomerate sizes. The gas velocity across the filter was adjusted to 2.1 cm/s as calculated by the flow of gas measured with a digital flowmeter (FMA-1720, Omega) divided by the area of the filter. Pressure drop across the filter was measured as 79 mm of $H_2O$ using a differential pressure transmitter (68071-28, Cole-Parmer).

Similar to the test conditions of Example 1, SiC particles with an average size of 0.6 microns were dispersed in air using a RODOS to generate a solid aerosol. This aerosol was used to challenge the nano-carbon black granules used in the filter. As mentioned above, the collection efficiency is dependent on the upstream concentration of aerosol. Accordingly, the filter was challenged against two different aerosol concentrations.

The aerosol was characterized using an Aerosizer LD, a time-of-flight based particle sizer that gave information on the particle size distribution and concentration of the aerosol before and after the filter. When the concentration of aerosol was low (as shown in FIG. 8A), there were almost no particles observed after the filter, resulting in a collection efficiency of 99.998%. At higher concentrations, the collection efficiency was reduced to 99.92%—a value that is very close to what is obtained using a conventional HEPA filter, as shown in FIG. 8B.

EXAMPLE 3

An alternative and improved experimental setup was assembled to measure collection efficiencies of customized filters according to further experimental evaluations of the disclosed filtration systems. The improved setup included: (i) an aerosol generation system composed of an atomizer for the generation of submicron size droplets, a drier for removal of the solvent that contained the solid/liquid particles, and a neutralizer for removal of electrostatic charges; (ii) a particle counter located upstream of the filters composed of a Diluter and a Condensation Particle Counter (CPC); (iii) a system for measuring particle size distributions composed of a Scanning Mobility Particle Sizer (SMPS); and (iv) instruments for measuring typical variables related to filtration, such as flow and pressure drop.

A schematic illustration of the improved experimental setup is provided in FIG. 9. The disclosed experimental setup is generally effective for use with a clean air source, and the atomizer may be used to generate aerosols, e.g., solid aerosols using PSL spheres and liquid aerosols using oil. The experimental setup is generally adapted to neutralize any electrostatic charges that may be generated/encountered, and includes a diluter for reducing the concentration of the aerosol feedstock. For purposes of particle size distribution measurements, the system includes classification functionality, i.e., an SMPS that classifies particles in the range of 15 to 800 nm, and detector functionality, i.e., a CPC that counts particles in the range of 0.015 μm up to 2 μm.

A solution of oil in ethanol (1:10000) was prepared to challenge the disclosed filters against oil droplets. The droplet size distribution resulting from the atomization of the oil-methanol solution is shown in FIG. 10A. Generally, resolution was lost below 50 nm and above 510 nm due to the particle concentration. The number mean size was 160 nm, the diameter mean size was 234 nm, and the volume mean size was 438 nm. The highest concentration was about $1.8\times10^6$ particles/$cm^3$. Similarly, a solution of Polystyrene Latex Spheres (PSLS) of 0.3 μm nominal size was diluted in deionized water (1:300) for tests in which solid aerosol was used to challenge the disclosed filters. The particle size distribution of the solid aerosol is shown in FIG. 10B. Generally, resolution was lost below 200 nm and above 350 nm due to particle concentration. The nominal sphere size was about 0.3 μm; however, smaller particles were generated due to the presence of surfactant and larger particles were generated due to agglomeration. The number mean size was 283 nm, the diameter mean size was 370 nm, and the volume mean size was 473 nm. The highest concentration was about $5 \times 10^4$ particles/$cm^3$.

Figure 11:
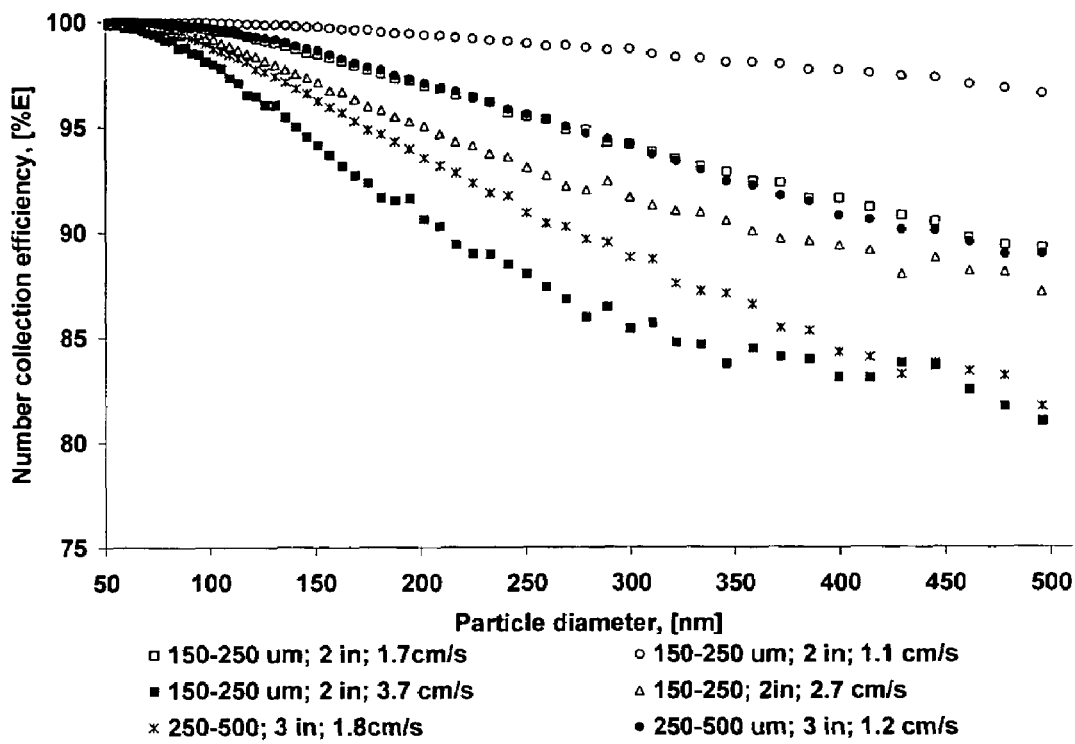
FIG. 11 is a plot of collection efficiencies for two (2) exemplary carbon black (Cabot Regal 660 A69) based nanoagglomerate filters at different gas velocities when challenged against submicron oil droplets, as described in Example 3 herein.
Figure 12:
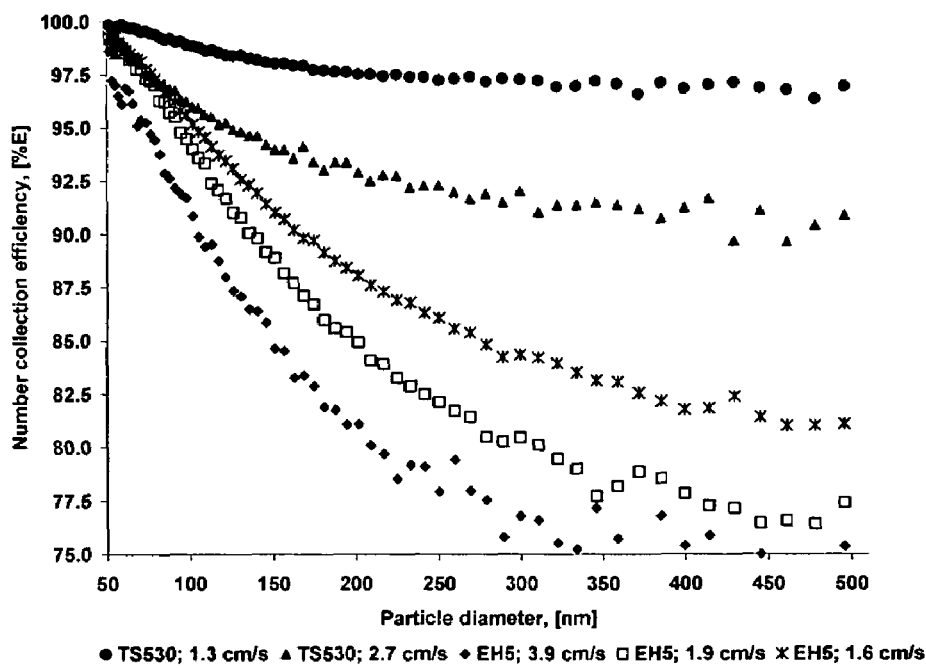
FIG. 12 is a plot of collection efficiencies for two (2) exemplary fumed silica based nanoagglomerate filters at different gas velocities when challenged against submicron oil droplets, as described in Example 3 herein.

Since the numbers of particles before and after the filter are obtained by using the SMPS, the collection efficiency can be calculated for each particle size within the particle size distribution of the aerosol. These results are shown in FIGS. 11 and 12 for nanoagglomerate filter systems. FIG. 11 shows the collection efficiencies of two (2) different nano-carbon black granule based filters according to the present disclosure. The first filter was assembled using granules of sizes 150 to 250 microns and 2 inches deep. The second filter was made with carbon black granules of sizes in the range of 250 to 500 microns and in a 3-inch deep packed bed. The data reflected in FIG. 11 clearly shows that the collection efficiency drops as gas velocity is increased. It also can be seen that the 3 inch deep filter has collection efficiency similar to a HEPA filter at a low gas velocity (1.1 cm/s).

FIG. 12 shows the collection efficiencies of two (2) filters containing consolidated agglomerates of fumed silica with sizes in the range of 500 to 850 microns. The main difference between the fumed silica agglomerates is their hydrophobicity. TS530 is hydrophobic while EH5 is hydrophilic. In both cases, the filters were 3 inches deep. As is apparent from the results set forth in FIG. 12, as the gas velocity is increased, the collection efficiency drops. High collection efficiency was obtained at gas velocities of about 1.3 cm/s for the TS530 agglomerates.

Figure 13:
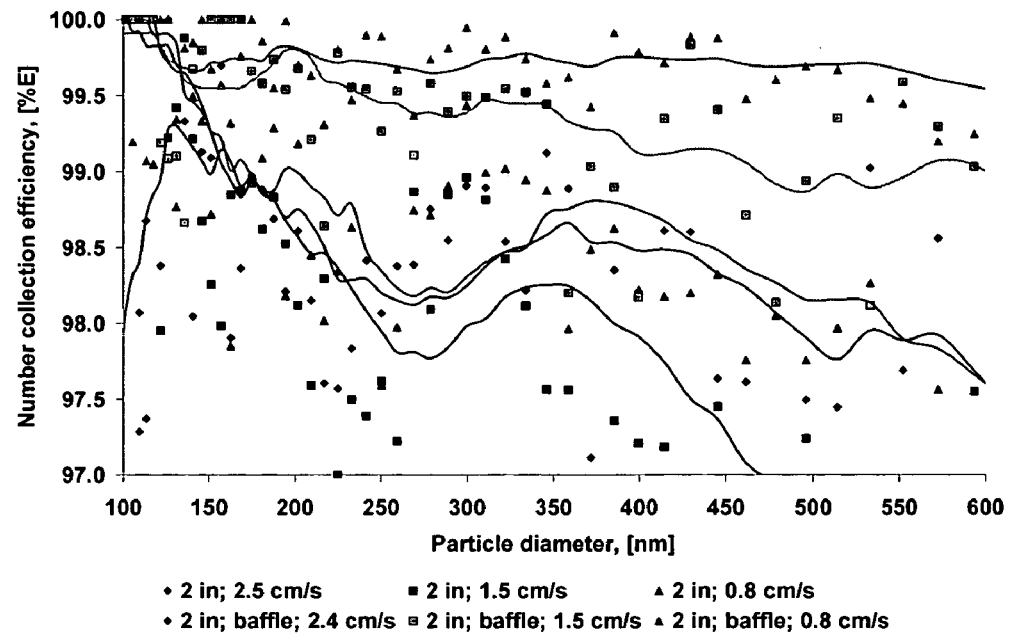
FIG. 13 is a plot of collection efficiencies for two (2) carbon black based nanoagglomerate filters at different gas velocities when challenged against submicron solid particles that includes baffled and non-baffled arrangements.

Another set of results obtained using the improved experimental setup described herein are shown in FIG. 13. Aerosol composed of solid particles generated by the atomization of a solution containing polystyrene latex spheres (PSLS) of 0.3 μm nominal sizes was employed. In this particular case, some of the filter modules were modified by adding baffles in the cylindrical cavity, as set forth in the legend for FIG. 13. The results shown in FIG. 13 indicate that filters with baffles have collection efficiencies similar to conventional HEPA systems and that such baffled systems perform better than filters of similar dimensions without baffles.

Figure 14:
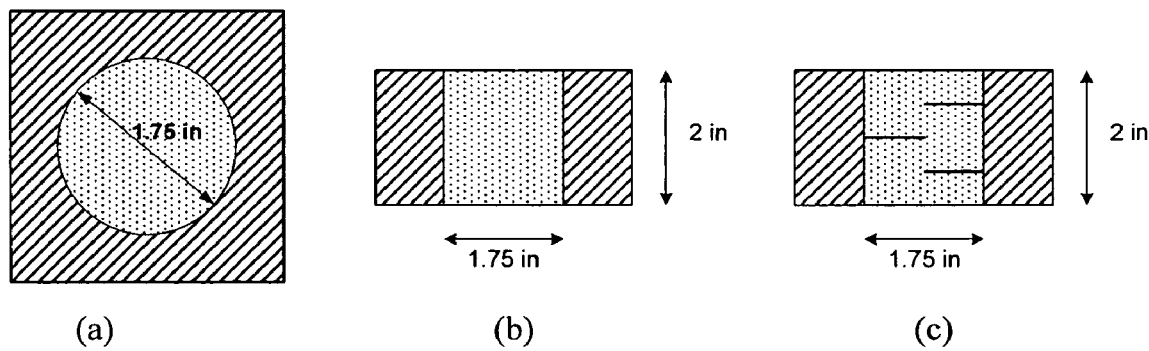
FIG. 14 provides a series of schematic views of exemplary filtration modules, including: (a) a front view showing an exemplary cylindrical cavity, (b) a sectional view of a module without baffles, and (c) a view that is similar to the module shown in view (b), except that the module includes baffles.

Schematic illustrations of baffled and non-baffled configurations are presented in FIG. 14. FIG. 14(b) shows a module without baffles and FIG. 14(c) shows a module with baffles. Test modules include three (3) layers of a polyester filtering fabric (Rayon/Polyester, Snofil) of 6 mil thickness, a micron rating of 69 and a density of 0.7 oz/yd$^2$ that were arranged to hold the filter media inside the module. The three layers were glued at each face of the module.

Figure 9:
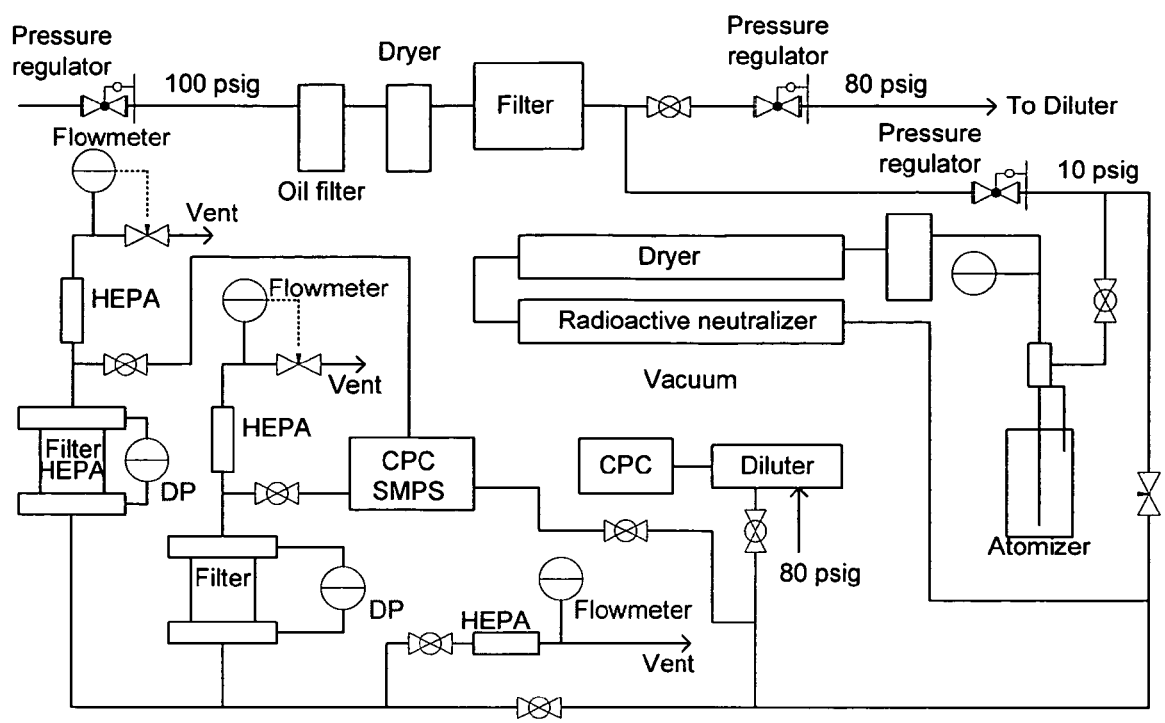
FIG. 9 is a schematic depiction of an experimental filtration setup.
Figure 10A:
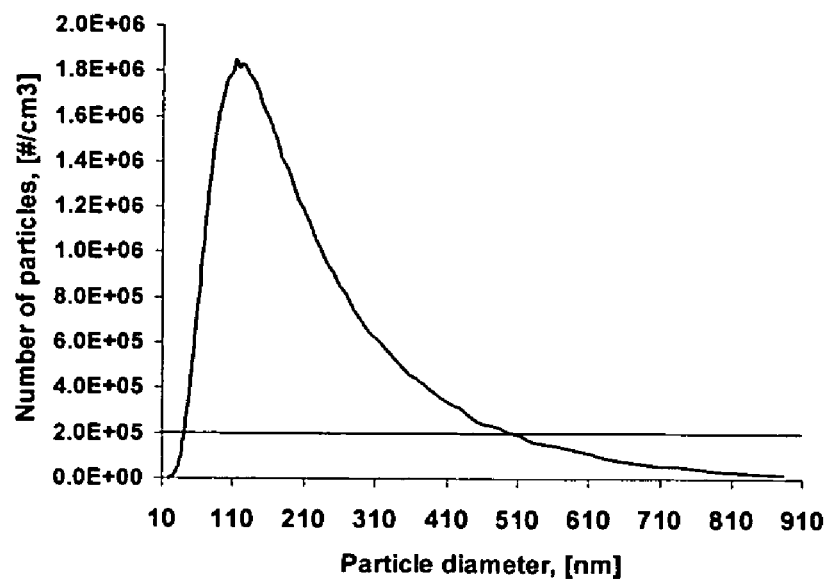
FIG. 10A is a plot of particle size distribution of oil droplets (liquid aerosol) before an exemplary nanoagglomerate filter, as described in Example 3 herein.
Figure 10B:
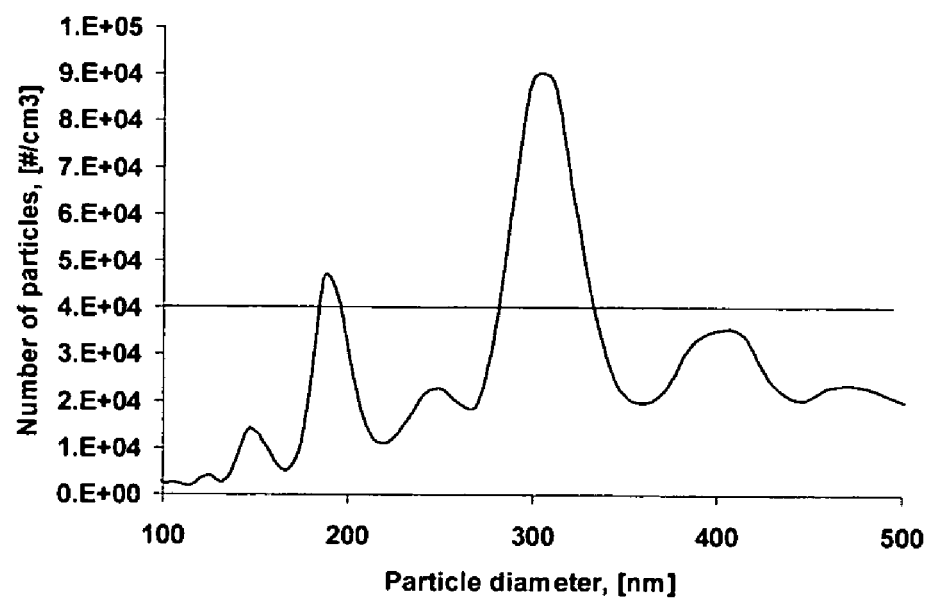
FIG. 10B is a plot of particle size distribution of a polystyrene latex sphere (PSLS) based aerosol (solid aerosol) before an exemplary nanoagglomerate filter, as described in Example 3 herein.
Figure 15:
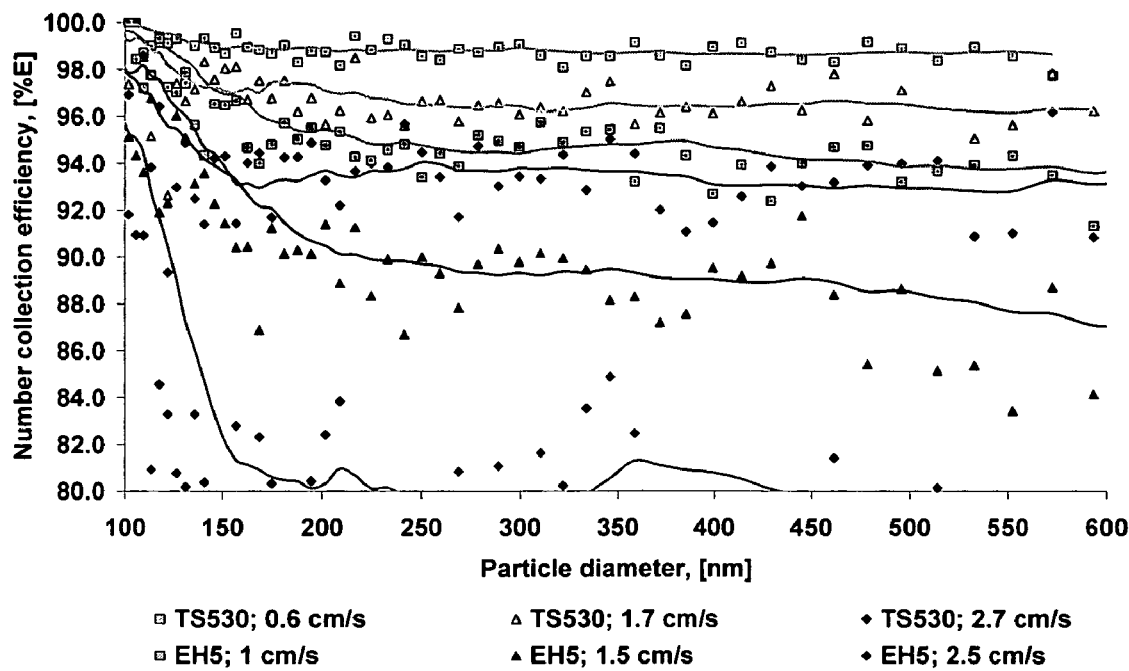
FIG. 15 is a plot of collection efficiencies for two (2) fumed silica nanoagglomerate filters challenged at different gas velocities against submicron solid particles.

Consolidated agglomerates of hydrophobic (TS530) and hydrophilic (EH5) fumed silica were also customized as filter media for testing in the experimental setup that is schematically depicted in FIG. 9. The collection efficiencies of these filters are shown in FIG. 15, and such results demonstrate that the hydrophobic fumed silica agglomerates have a performance similar to conventional HEPA filters when challenged against low aerosol velocities.

EXAMPLE 4

Figure 16:
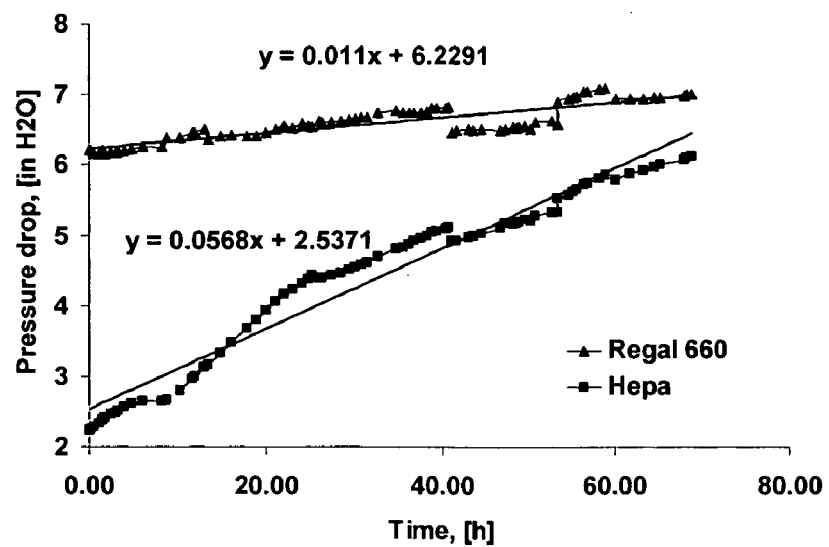
FIG. 16 is a plot of the evolution of the resistance of a HEPA fiber based filter (squares) and a 2 inch deep-bed granular filter of carbon black nanoagglomerates (Cabot Regal 660 A69) as a function of time.

A filter module containing granules of nano carbon black (Regal 660 A69) was customized in a 2 inch deep packed bed with baffles. As shown in FIG. 13, this filter gives very high collection efficiency. An estimation of the filtration capacity is required in order to compare this filter against current HEPA filters. For this purpose, a HEPA fiber-based filter was connected in parallel with the granulated nano carbon black filter so that the same challenging aerosol passed through both filter systems. The gas flow was set to and maintained at 2.5 cm/s for both filters, and they were challenged against solid aerosol particles (PSLS) for around 70 hours. At all times, the gas velocity was kept constant. The evolution of the resistance of both filter systems was determined based on pressure drop and the results are shown in FIG. 16. The rate at which the pressure drop of the filters increases is given by the slope of the linear regression. HEPA filter resistance increased at about five (5) times faster than the granular nano carbon black filter. This result implies that the HEPA filter has a lower capacity and demonstrates clearly superior performance for the disclosed carbon black nanoagglomerate filter. Indeed, as compared to the disclosed filter, the HEPA filter would have to be discarded (or cleaned) much sooner because a high resistance lowers the amount of gas passing through the filter, limiting its filtration capacity.

The following tables summarize test results for disclosed filter media systems.

TABLE 1

TEST RESULTS FOR PACKED BEDS AGAINST OIL DROPLETS

| Filter Media | Granule Size (μm) | Thickness (in) | Gas Velocity | DP (Pa) | % E @0.3 μm | Lowest % E |
|---|---|---|---|---|---|---|
| Carbon blac | 150-250 | 2 | 1.1 | 250 | 98.6 | 97 |
| Carbon blac | 150-250 | 2 | 1.7 | 400 | 94.5 | 89 |
| Carbon blac | 150-250 | 2 | 2.7 | 600 | 91.6 | 87 |
| Carbon blac | 150-250 | 2 | 3.7 | 830 | 85 | 81 |
| Carbon blac | 250-500 | 3 | 1.2 | 300 | 94.5 | 89 |
| Carbon blac | 250-500 | 3 | 1.8 | 400 | 88.5 | 82 |
| TS-530 | 500-850 | 3 | 1.3 | 120 | 97.25 | 96 |
| TS-530 | 500-850 | 3 | 2.7 | 200 | 92.00 | 90 |
| EH-5 | 500-850 | 3 | 1.6 | 100 | 84.00 | 81 |
| EH-5 | 500-850 | 3 | 1.9 | 130 | 80.50 | 76 |
| EH-5 | 500-850 | 3 | 3.9 | 230 | 76.20 | 74 |

TABLE 2

TEST RESULTS FOR FLUIDIZED BEDS AGAINST OIL DROPLETS

| Filter Media | Granule Size (μm) | Thickness (in) | Gas Velocity | DP (Pa) | % E @0.3 μm | Lowest % E |
|---|---|---|---|---|---|---|
| TS-530 | <250 | 15 | 1.1 | 90 | 99.7 | 99.5 |
| TS-530 | <250 | 15 | 1.4 | 90 | 99.2 | 93 |
| EH-5 | <500 | 4 | 1.8 | 1500 | 100 | 100 |

TABLE 3

TEST RESULTS FOR PACKED BEDS AGAINST PSLS

| Filter Media | Granule Size (μm) | Thickness (in) | Gas Velocity | DP (Pa) | % E @0.3 μm | Lowest % E |
|---|---|---|---|---|---|---|
| Regal 660 A69 | 150-250 | 2 | 0.8 | 184 | 98.3 | 98 |
| Regal 660 A69 | 150-250 | 2 | 1.5 | 360 | 98 | 97 |
| Regal 660 A69 | 150-250 | 2 | 2.5 | 550 | 92 | 90 |
| Regal 660 A69 | 150-250 (baffled) | 2 | 0.8 | 440 | 99.65 | 99.3 |

TABLE 3-continued

TEST RESULTS FOR
PACKED BEDS AGAINST PSLS

| Filter Media | Granule Size (μm) | Thickness (in) | Gas Velocity | DP (Pa) | % E @0.3 μm | Lowest % E |
|---|---|---|---|---|---|---|
| Regal 660 A69 | 150-250 (baffled) | 2 | 1.5 | 820 | 99.45 | 99 |
| Regal 660 A69 | 150-250 (baffled) | 2 | 2.4 | 1300 | 98.20 | 98 |
| TS-530 | 500-850 | 3 | 0.6 | 40 | 99.00 | 98.5 |
| TS-530 | 500-850 | 3 | 1.7 | 110 | 96.50 | 96 |
| TS-530 | 500-850 | 3 | 2.7 | 161 | 93.50 | 91 |
| EH-5 | 500-850 | 3 | 1 | 64 | 94.70 | 93 |
| EH-5 | 500-850 | 3 | 1.5 | 100 | 88.70 | 87 |
| EH-5 | 500-850 | 3 | 2.5 | 160 | 80.00 | 75 |

PROPHETIC EXAMPLE 1

Figure 17:
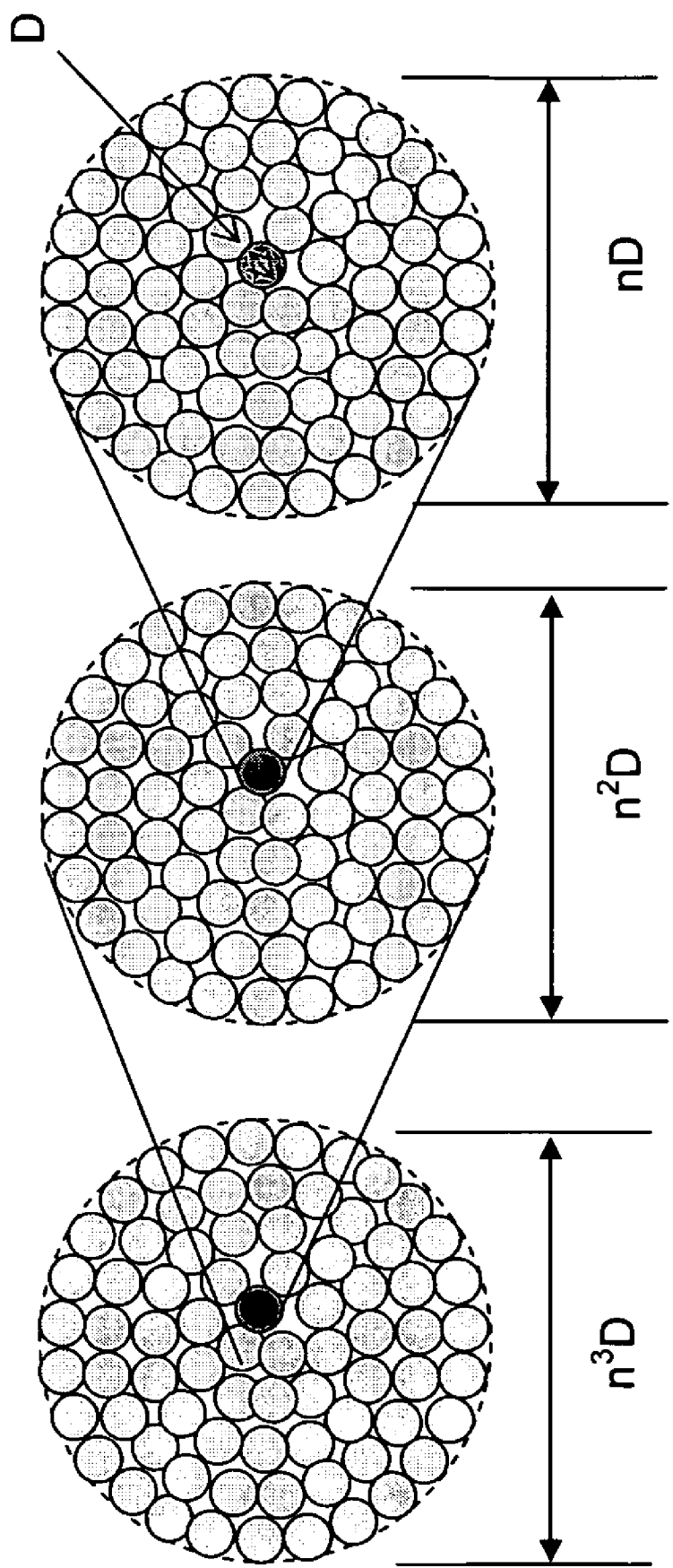
FIG. 17 is a schematic depiction of a hierarchical self-similar fractal agglomeration sequence

Engineered particle systems characterized by a hierarchical granulated porous bead structure having multiple pore-sizes may be employed to effect filtration. The building block of such engineered particles would be small nano- or micron-size particles, e.g., ranging in diameter from 20 nm to 1 micron, but preferably 50 nm to 100 nm. Through an agglomeration sequence, self-similar fractal structures may be formed. FIG. 17, which is to be viewed from right-to-left, provides a schematic depiction of an exemplary agglomeration sequence for forming hierarchical self-similar agglomerates. Starting from a primary building block particle having diameter D, a "Level 1 Agglomerate" (A1) can be formed. The contemplated agglomeration sequence for forming engineered particle systems and the quantitative analysis associated therewith is set forth herein.

1. If the primary particle is defined to be a spherical particle, and is labeled as a level "1" sphere, having diameter "D", and radius "$R_1$", then the primary particle would have a volume $$"V1": \quad V_1 = \frac{4}{3}\pi R_1^3.$$

2. A plurality of these primary particles may be used in forming an agglomerate "A1", where there is a random packing structure within the agglomerate and a packing density of "$\eta$", which can be, for example, 0.65. Assuming that the "size enlargement" factor associated with agglomeration of the plurality of primary particles is "n", so that the diameter of A1 is nD, and the corresponding radius may be defined as "$R_2$", it is apparent that $R_2=nR_1$. The number of primary particles, "N", each having diameter "D" contained inside the agglomerate "A1", may be determined from a simple equality:

N(volume of one primary particle)=(Solid fraction of the agglomerate)(volume of the agglomerate A).

This equality translates to the equation: $N(V_1)=(\eta)(V_2)$, where $$V_2 = \frac{4}{3}\pi R_2^3,$$

which yields $N=\eta n^3$. As noted above, "n" is the size enlargement factor, and "$\eta$" is the solid packing fraction of the agglomerate.

3. If the disclosed agglomeration process is continued to a specific number of levels, e.g., level 5, then by a similar analysis, "N" number of "A1" agglomerates will be found inside one agglomerate "A2"; "N" number of "A2" agglomerates will be inside one agglomerate "A3"; "N" number of "A3" agglomerates will be found inside one agglomerate "A4"; and, finally, "N" number of "A4" agglomerates will be found inside one agglomerate "A5". Note that in all cases, i.e., at each level, the number "N" is defined by the following relationship: $N=\eta N^3$.

4. It is noted that:
    (a) One agglomerate "A2" has $N^2$ primary particles, "A3" has $N^3$ primary particles, "A4" has $N^4$ primary particles, "A5" has $N^5$ primary particles, and hence the $j^{th}$ agglomerate "Aj" has $N^j$ primary particles.
    (b) One "A2" agglomerate has N A1 agglomerates, one A3 agglomerate has N A2 agglomerates, one A4 agglomerate has N A3 agglomerates, one A5 agglomerate has N A4 agglomerates, and thus any A(j) agglomerate has N A(j-1) agglomerates.
    (c) At any agglomeration level, the number of pores would be proportional to the number of primary particles and the number of agglomerates; accordingly, the pore size and number distribution at any agglomerate level could be determined.

5. Thus, for an agglomerate at any level, e.g., level A5, the solid content could be determined by the following simple equality:

(Solid fraction content of the A5 agglomerate)=(volume of the agglomerate A)/($N^5$×volume of one primary particle)

This yields the following relationship:

(Solid Fraction content of the A5 agglomerate) =

$$\left(\frac{4}{3}\pi R_5^3\right) \Big/ \left((\eta n^3)^5 \times \frac{4}{3}\pi R_1^3\right)$$

Note that $R_5=n^5 R_1$, which allows simplification to:

(Solid fraction content of the A5 agglomerate)=$\eta^5$,

Hence, the total porosity of the A5 agglomerate is $1-\eta^5$ and, by the same token, any level agglomerate A(m) has a total porosity equal to $1-\eta^m$. Thus, the fractal agglomerates could be generated with arbitrarily high values of total void fraction, even though the starting point is a larger sized primary particle.

6. Even if a relatively large primary particle having a diameter of a few microns were to be utilized as a starting material and the agglomeration sequence were carried out five (5) times, the total void fraction of the resulting fractal agglomerate would nonetheless be over 88%. Indeed, if a 1 micron particle were used as the starting material and an enlargement factor of n=10 were employed, the A5 agglomerate for this sequence would be an agglomerate having a diameter of 10 cm. While this A5 agglomerate is highly porous, it may be practically useless for filtration. Accordingly, it would generally be advantageous to start with a relatively small primary particle in fabricating agglomerates for filtration applications.

7. For primary particles having a diameter of one micron, if the particle size were scaled up by a factor of ten (10) through each agglomeration level but the final agglomerate size were maintained at no greater than 1000 microns, then the porosity of the final agglomerate would be about 0.725, which would be large enough for many industrial applications, including filtration applications. In this calculation, a relatively dense packing of the agglomerates is assumed. However, in most powder agglomeration processes, only a loose packing of particles is generally achieved, e.g., packing levels of about 0.5. For such packing levels, a final agglomerate having a diameter of about 1 mm produced with starting a primary particle size of one (1) micron and a scaling factor of ten (10) would provide a higher porosity of 0.875.

8. With respect to pore size distribution, in one A6 agglomerate, a total of $N^6$ primary particles would be present, from which the number of pores of a size (i.e., average pore radius) which is a fraction (e.g., approximately about 40% depending on the assumed packing mode—note that it would be some fraction less than 0.5 or 50%) of $R_1$ would be approximately proportional to the number of primary particles, i.e., $N^6$. By the same analysis, the larger pores between neighboring A1 agglomerates would be proportional to the number of those pores, $N^5$, and the size would be proportional to $R_2$. Finally, the largest pores would be of size proportional to $R_5$, and that number is just N.

9. The pore volumes at a given pore size can also be analyzed. The largest pores occupy volume $(1-\eta)$ on a normalized basis. Then the next level would occupy a normalized volume of $\eta(1-\eta)$, and the next would be $\eta^2(1-\eta)$, and so on.

In sum, the agglomeration sequence of this prophetic example is self-similar and the fractal dimension of the resultant agglomerate may be estimated/pre-determined if the "size enlargement" were fixed. However, the final particle-assembly would not necessarily exhibit a fixed level of enlargement in subsequent granule sizes, as will be apparent to persons skilled in the art. Such agglomerates are useful in filtration applications, because they provide multiple pore sizes, which may be tailored to provide a certain desired level of filtration yet having an acceptable level of pressure drop across the filter.

Although the present disclosure has been described with reference to exemplary embodiments and implementations of the disclosed systems and methods, the present disclosure is not limited to such exemplary embodiments/implementations. Rather, the present disclosure extends to alternative embodiments and implementations, and such alternative embodiments/implementations are expressly encompassed within the scope and spirit of the present disclosure.

The invention claimed is:

1. A filter system comprising:
a filter media that includes agglomerates or granules of nanoparticles in an amount sufficient to effect a desired level of filtration, wherein the agglomerates or granules of nanoparticles define a hierarchical fractal structure such that a plurality of agglomerates or granules of nanoparticles are bonded together to form at least one higher order agglomerate or granule.

2. A filter system according to claim 1, wherein the filter media is effective to remove sub-micron and micron sized particles.

3. A filter system according to claim 1, wherein the filter media is effective to remove solid and liquid aerosol particles.

4. A filter system according to claim 1, wherein the filter media includes agglomerates of nanoparticles, and wherein the agglomerates exhibit a porosity of at least 0.9.

5. A filter system according to claim 1, wherein the filter media includes granules of nanoparticles, and wherein the granules have a porosity that is smaller than 0.9.

6. A filter system according to claim 1, wherein the agglomerates or granules of nanoparticles define a filter bed.

7. A filter system according to claim 6, wherein the filter bed has a depth that is determined based on the size of the agglomerates or granules and a target collection efficiency.

8. A filter system according to claim 1, wherein the agglomerates or granules exhibit particle sizes ranging between about 150 to about 250 microns and wherein the agglomerates or granules define a dry filter bed having a depth of about 2 inches to about 3 inches for filtration of gas streams having a gas velocity of less than about 5 cm/s.

9. A filter system according to claim 1, wherein said filter media is incorporated into a HEPA filter system.

10. A filter system according to claim 1, wherein the agglomerates or granules of nanoparticles are carbon black.

11. A filter system according to claim 1, wherein the agglomerates or granules of nanoparticles are fumed silica.

12. A filter system according claim 1, wherein the agglomerates or granules of nanoparticles are formed through a process selected from the group consisting of a nanoagglomerate fluidization process, consolidation by sieving, or a granulation process.

13. A filter system according to claim 1, wherein the filter media is incorporated into a baffled filtration unit.

14. A filter system according to claim 1, wherein the filter media consists of engineered particle systems characterized by a hierarchical granulated porous bead structure having multiple pore-sizes.

15. A filter system comprising:
a filter media that includes agglomerates or granules of nanoparticles in an amount sufficient to effect a desired level of filtration, wherein the agglomerates or granules of nanoparticles define a hierarchical fractal structure, wherein the agglomerates are comprised of subagglomerates and wherein the subagglomerates are comprised of primary agglomerates.

16. A method for filtering a feed stream, comprising:
(a) providing a filter media that includes agglomerates or granules of nanoparticles in an amount sufficient to effect a desired level of filtration, wherein the agglomerates or granules of nanoparticles define a hierarchical fractal structure such that a plurality of agglomerates or granules of nanoparticles are bonded together to form at least one higher order agglomerate or granule, and
(b) passing a feed stream through said filter media so as to effect the desired level of filtration.

17. A method according to claim 16, wherein the feed stream includes sub-micron and micron sized particles and said filter media is effective in removing the sub-micron and micron-sized particles.

18. A method according to claim 17, wherein collection efficiencies of at least 99% are achieved in removing the sub-micron and micron-sized particles.

19. A method according to claim 16, wherein the filter media includes agglomerates of nanoparticles, and wherein the agglomerates exhibit a porosity of at least 0.9.

20. A method according to claim 16, wherein the filter media includes granules of nanoparticles, and wherein the granules have a porosity that is smaller than 0.9.

21. A method according to claim 16, wherein said filter media is incorporated into a HEPA filter system.

22. A method according to claim 16, wherein the agglomerates or granules of nanoparticles are carbon black.

23. A method according to claim 16, wherein the agglomerates or granules of nanoparticles are fumed silica.

24. A method according to claim 16, wherein the filter media is incorporated into a filtration unit and wherein the filtration unit includes a plurality of baffles.

25. A method according to claim 16, wherein the filter media consists of engineered particle systems characterized by a hierarchical granulated porous bead structure having multiple pore-sizes.

* * * * *